Oct. 17, 1939.  F. E. ALTMAN  2,176,482
LENS
Filed Nov. 6, 1937

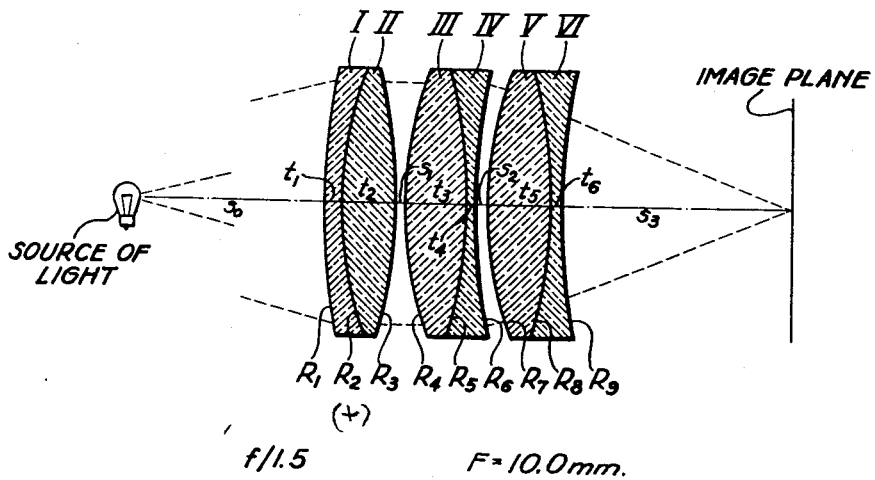

| LENS | GLASS | RADII | SPACINGS |
|---|---|---|---|
| I | $N_D=1.6168$ $\nu=36.6$ | $R_1=+65.5$ mm. | $s_0=44.0$ mm. (To Source) |
| | | $R_2=+17.9$ mm. | $t_1=0.76$ mm. |
| II | $N_D=1.5150$ $\nu=64.6$ | $R_3=-28.1$ mm. | $t_2=2.38$ mm. |
| III | $N_D=1.5150$ $\nu=64.6$ | $R_4=+9.84$ mm. | $s_1=0.19$ mm. |
| | | | $t_3=2.75$ mm. |
| IV | $N_D=1.6168$ $\nu=36.6$ | $R_5=-10.5$ mm. | $t_4=0.52$ mm. |
| | | $R_6=+42.5$ mm. | $s_2=0.21$ mm. |
| V | $N_D=1.5150$ $\nu=64.6$ | $R_7=+9.84$ mm. | $t_5=2.75$ mm. |
| | | $R_8=-10.5$ mm. | $t_6=0.52$ mm. |
| VI | $N_D=1.6168$ $\nu=36.6$ | $R_9=+42.5$ mm. | $s_3=8.64$ mm. (To Image) |

Fred E. Altman
INVENTOR

BY Newton M. Ferris
Rolla L. Carter
ATTORNEYS

Patented Oct. 17, 1939

2,176,482

UNITED STATES PATENT OFFICE 2,176,482

LENS

Fred E. Altman, Rochester, N. Y., assignor to Eastman Kodak Company, Rochester, N. Y., a corporation of New Jersey Application November 6, 1937, Serial No. 173,217

5 Claims. (Cl. 88—57)

This invention relates to lenses and particularly to scanning objectives used in the electro-optical transmission of pictures such as in television.

An optical system to be useful for scanning purposes should have a large relative aperture and be capable of accurately forming an image, preferably reduced, of a small "point" source of light. The object of the present invention is to produce such an optical system more highly corrected than hitherto.

In systems of this type many well-known advantages are gained by using two or more cemented doublets preferably achromats in series. This invention relates particularly to such systems and has for its primary object the production of a system of this type highly corrected for coma, spherical aberration and chromatic aberration.

According to the invention, a high-aperture small field objective is made up having a front component which acts substantially as a collimator and a rear component which acts as an objective focused on infinity, i. e. focused to accept collimated light. The two components are preferably separately achromatic but not necessarily so. The rear component preferably comprises a plurality of doublets, two being sufficient for most purposes. Each of these doublets is a biconvex element cemented to the front of a negative element which may be meniscus, or concave plano, but which is preferably bi-concave. Furthermore, the spacing between consecutive doublets is small, and the spacing between the two components is not critical but is also preferably small to conserve space.

Other objects and advantages of the present invention will be apparent from the following description of a preferred embodiment of it shown in the accompanying drawing.

In the drawing, the objective made according to the invention receives light from a source and focuses it to a point on the image plane as shown. This objective has the following specifications:

| Lens | Glass | Radii | Spacings |
|---|---|---|---|
| I | $N_D=1.6168$<br>$V=36.6$ | $R_1=+65.5$ mm.<br>$R_2=+17.9$ | $S_0=44.0$ to source.<br>$t_1=.76$ mm. |
| II | $N_D=1.5150$<br>$V=64.6$ | $R_3=-28.1$ | $t_2=2.78.$ |
| III | $N_D=1.5150$<br>$V=64.6$ | $R_4=+9.84$<br>$R_5=-10.5$ | $S_1=.19.$<br>$t_3=2.75.$<br>$t_4=.52.$ |
| IV | $N_D=1.6168$<br>$V=36.6$ | $R_6=+42.5$ | $S_2=.21.$ |
| V | $N_D=1.5150$<br>$V=64.6$ | $R_7=+9.84$<br>$R_8=-10.5$ | $t_5=2.75.$<br>$t_6=.52.$ |
| VI | $N_D=1.6168$<br>$V=36.6$ | $R_9=+42.5$ | $S_3=8.64$ to image. |

In this lens system the front component comprising elements 1 and 2 receives light from the source and collimates it since this component has a front focus of 44.0 mm. which equals $S_0$. This collimated light is then focused by the rear component to the point where the optic axis intersects the image plane. The rear component preferably consists of a plurality of achromats, two being satisfactory for most purposes as shown. For convenience in manufacture I prefer to make up the doublets which comprise the rear component, identical to one another, but this feature is not necessary to the broad invention.

Furthermore, most satisfactory results are obtained when at least one of the doublets comprises a bi-convex element cemented to the front of a bi-concave element. In the arrangement shown, both doublets are thus made.

The front component is working at a relative aperture of about f. 5.5 and has almost negligible spherical aberration and coma in itself. The rear component, at an aperture, of f. 1.5 also has negligible aberrations. In fact, at this wide aperture considering only the marginal rays as compared to the paraxial rays forgetting for a moment the intermediate zones, the spherical aberration and coma theoretically reach the vanishing point. However, the theoretical values of these aberrations for the zone corresponding to f. 2.0 are slightly larger, but still negligible from a practical point of view.

Having thus described the preferred embodiment of my invention, I wish to point out that it is not limited to this specific structure, but is of the scope of the appended claims.

What I claim and wish to protect by Letters Patent of the United States is:

1. A highly corrected high aperture objective for imaging a small linear source of light, comprising two collective parts of which one is a collimator axially spaced its focal length from the source and substantially fulfilling the sine condition for correcting coma and the other part also separately fulfilling the sine condition for correcting coma consists of a plurality of spaced doublets each being a biconvex crown element cemented to the front of a dispersive element whose rear surface has a greater radius of curvative than its cemented surface.

2. An objective according to claim 1 in which the spaced doublets are identical and the spacing between consecutive doublets is less than the thickness of one doublet.

3. A high aperture objective for imaging a small source of light comprising a collective front component axially spaced its focal length from the light source, and being chromatically corrected having a meniscus negative element cemented to the front of a biconvex element the radius of curvature of the cemented surface being less than either of the outer surfaces and a collective rear component for focusing the collimated light from the front component, said rear component being separately chromatically corrected and consisting of a plurality of doublets each made up of a biconvex element cemented to a negative element whose rear surface is weaker than either of the other surfaces of the doublet, the negative element in at least one of the doublets being biconcave.

4. A high aperture objective for forming a reduced image of a small source of light comprising an achromatic collective front component axially spaced its focal length from the light source and a collective rear component having a focal length between one-tenth and one-half that of the front component for focusing the collimated light from the front component, said rear component consisting of a plurality of achromatic doublets each having a biconvex element cemented to the front of a negative element, each component separately fulfilling the sine condition for correcting coma.

5. An optical system for forming a small narrow and intense line of light comprising a small elongated source of light and an objective consisting of a collective front component corrected comatically and chromatically and axially spaced its focal length from the source and a collective rear component whose focal length is between one-tenth and one-half that of the front component for focusing the collimated light from the front component, said rear component being also corrected comatically and chromatically and consisting of a plurality of doublets spaced from each other less than the thickness of one doublet and each having a biconvex front element.

FRED E. ALTMAN.